(12) United States Patent
Hendriks et al.

(10) Patent No.: US 7,489,448 B2
(45) Date of Patent: Feb. 10, 2009

(54) OPTICAL SCANNING DEVICE

(75) Inventors: Bernardus Hendrikus Wilhelmus Hendriks, Eindhoven (NL); Johannes Joseph Hubertina Barbara Schleipen, Eindhoven (NL); Stein Kuiper, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 316 days.

(21) Appl. No.: 10/599,330

(22) PCT Filed: Mar. 22, 2005

(86) PCT No.: PCT/IB2005/050981

§ 371 (c)(1),
(2), (4) Date: Sep. 26, 2006

(87) PCT Pub. No.: WO2005/096289

PCT Pub. Date: Oct. 13, 2005

(65) Prior Publication Data

US 2008/0239463 A1    Oct. 2, 2008

(30) Foreign Application Priority Data

Mar. 31, 2004  (EP) .................................. 04101324

(51) Int. Cl.
*G02B 3/00*   (2006.01)
*G02B 13/14*  (2006.01)

(52) U.S. Cl. ..................... 359/649; 359/650; 359/651; 359/726; 359/798; 359/799; 359/800; 359/806; 359/665; 359/666; 359/355; 355/53

(58) Field of Classification Search ................ 359/355, 359/649–651, 726, 798–800, 665, 666; 355/53
See application file for complete search history.

(56) References Cited

U.S. PATENT DOCUMENTS

| 5,001,333 | A   | 3/1991  | Marshall |
| 6,388,822 | B1  | 5/2002  | Kitamura et al. |
| 7,170,832 | B2* | 1/2007  | Tukker et al. ............ 369/44.27 |
| 2002/0176148 | A1 | 11/2002 | Onuki et al. |
| 2006/0158971 | A1* | 7/2006 | Hendriks et al. ......... 369/44.23 |

FOREIGN PATENT DOCUMENTS

JP     2001249203     9/2001

(Continued)

OTHER PUBLICATIONS

B. Berge; "Variable Focal Lens Controlled by an External Voltage: an Application of Electrowetting", Eur. Phys. J.E. 3, 2000, pp. 159-163, XP002285977.

*Primary Examiner*—Evelyn A. Lester
(74) *Attorney, Agent, or Firm*—Michael E. Belk (57) ABSTRACT

An optical scanning device provides a radiation source (2,200), a collimator lens (4,40), an objective (7,90) for converting a beam (5,30') to a scanning spot at the position of an information layer (101) of a record carrier (1,100). The device also includes an electrowetting cell (6). The electrowetting cell (6) acts such that a beam (5,30') enters the objective (7,90) at a predetermined height of an entrance pupil of the objective (7,90) independent of the position of the objective (7,90) and that the beam (5,30') forms a predetermined angle at the entrance pupil of the objective (7,90) with the optical axis (8). In this way the rim intensity may be kept constant over the entrance pupil of the objective (7,90).

8 Claims, 4 Drawing Sheets

FOREIGN PATENT DOCUMENTS

| | | | |
|---|---|---|---|
| WO | 200148747 | A2 | 7/2001 |
| WO | 200173775 | A1 | 10/2001 |
| WO | 2003069380 | A1 | 8/2003 |
| WO | 2004027769 | A1 | 4/2004 |

* cited by examiner

OPTICAL SCANNING DEVICE

The invention relates to an optical scanning device for scanning an information layer by means of a radiation beam, the device comprising a radiation source for emitting the radiation beam, an objective for converting the radiation beam to a scanning spot at the position of said information layer, and means to adjust the distance between the radiation source and the objective.

The invention also relates to an optical recording system comprising an optical scanning device.

Known optical scanning devices include an optical head scanning an optical record carrier. The record carrier is an optical disc comprising a transparent layer, on one side of which an information layer is arranged. A protection layer protects the side of the information layer facing away from the transparent layer. Information may be stored in the information layer of the record carrier in form of optical detectable marks or points arranged in parallel, concentric or spiral tracks. The marks may be in any optical readable form, e.g. in the form of pits, lines or areas with a reflection coefficient or optical phase different from their surroundings.

The optical scanning device comprises a radiation source emitting a radiation beam. The radiation beam is used for scanning the information layer of the optical record carrier. A polarizing beam splitter reflects or transmits the diverging beam in the optical path towards a lens system, which comprises an objective. The objective changes the beam to a converging beam. The convergent beam impinges on an entrance face of the record carrier. The objective has a spherical aberration correction adapted for passage of beams through the thickness of the transparent layer. The beam going through the objective forms a spot on the information layer. The beam is reflected by the information layer. Then the beam is a diverging beam and is transformed into a collimated beam by the objective and finally into a converging beam. The beam splitter separates the beams, namely the forward and the reflected beams, by transmitting at least a part of the converging beam towards a detection system. The detection system converts the radiation into electrical output signals.

The scanning device may be moved mainly in a radial direction that are perpendicular to the optical axis of the device. The objective is installed on a ring of magnetic material. The magnetic material is attached to a housing by known means. The housing contains a coil, which produces a magnetic field, which exerts a force on the magnetic material. In this way the objective may also be moved up or down along its optical axis.

International Patent Application WO 01/48747 A2 describes an optical wavefront modifier, which is adapted for modifying a wavefront of an optical beam passing through the modifier. Such optical wavefront modifiers are used to change the shape of the wavefront of a beam by introducing path length differences depending on the position in the cross-section of the beam. It may also be used to change the vergence by introducing a focus curvature in the wavefront of the beam or to change the direction of the beam by introducing tilt. A wavefront modifier may also be provided as a wavefront compensator for compensating or removing spherical aberration or coma from a wavefront. The wavefront compensator is arranged in the optical path between a collimator lens and an objective. This wavefront modifier also operates as an aberration compensator, correcting or compensating an undesired aberration in a beam. The aberration compensator compensates coma caused by tilt of the record carrier, astigmatism caused by the off-centre objective lens, spherical aberration caused by variations in the thickness of the transparent layer of the record carrier, or other aberrations. The optical wavefront modifier comprises mainly a first and a second transparent electrode layer and a flat medium for modifying the wavefront depending from electrical excitation of the medium, which is arranged between the electrode layers. These electrode layers are adapted to impress a first wavefront modification of a first order of a radius in the cross-section of the beam in the plane of the medium and to impress simultaneously a second wavefront modification of a second order of the radius different from the first order.

For example, with such or similar systems as known from WO 01/48747 A2, the objective is moved to find the right track. In split optics configuration only the objective moves during access while the remainder of the optical pick-up unit is fixed. This means that the distance between the collimator lens and the objective changes depending on which track position is read out now. During scanning from the inner rim to the outer rim of the record carrier there is a different distance between the collimator lens and the objective. For example, if there is a long distance between the collimator lens and the objective then a slightly vergent beam between the collimator lens and the objective has time to spread out more than if the objective and the collimator lens are close to each other. Therefore, if an illumination source illuminates some surfaces and the surfaces are far away but the objective has always the same size and therefore also the entrance pupil of the objective, then the intensity distribution over the entrance pupil of the objective will be different. This problem is strongly dependent on the intensity distribution of the entrance pupil of the objective. The spot size on the disc depends on the intensity at the rim of the objective's pupil relative to the intensity at the centre of the objective's pupil. If the rim intensity decreases in the pupil then the spot size on the disc will become larger leading to implications on how good signals or pits can be read out of the disc. With already longer known systems in which the collimator lens and the objective are fixed to each other in distance and the whole optical pick-up unit moves during access, there is no effect on spot size and signal readout, because the relative rim intensity at the objective stays the same on the inner circle and on the outer circle of the disc. In non-split optics systems like conventional optical pick-up units the rim intensity changes when the vergence of the radiation beam between the collimator lens and the objective is changed. However, it does not change when going from inner to outer track on the record carrier.

For split optics the rim intensity is also changed when the vergence of the beam between the collimator lens and the objective is changed. However, the rim intensity also changes when going from inner to outer track on the record carrier. This change in vergence between the collimator lens and the objective is used to generate spherical aberration in the objective. The amount of spherical aberration is used to compensate for instance for dual layer disc the disc thickness difference of the two layers. Due to the fact that one of the layers of dual layer discs is deeper in the disc for reading information of the disc a larger cover layer must be passed through. Thus spherical aberration is generated. When switching from one information layer to the other information layer two different amounts for spherical aberration are generated. The objective is designed to compensate the most of the spherical aberration. However they cannot produce two different amounts of spherical aberration. The objective can only produce one amount of spherical aberration and in all other cases the vergence of the beam entering the objective has to be changed.

One way to compensate for spherical aberration when switching for instance from one information layer to the other for a dual layer disc is by switching the vergence of a radiation beam entering the objective. Since the objective substantially complies with the Abbe sine condition, a changing of the vergence for the incoming beam results in the generation of spherical aberration. Although this principle works quite well, for split optics, as explained above, a vergent beam results in a change in rim intensity when the distance between the collimator lens and the objective is changed. Hence, it follows that the rim intensity and the optical throughput efficiency becomes dependent on the track that is being read on the disc. Since the size of the spot is related to the rim intensity, this change in rim intensity is not acceptable.

It is an object of the invention to provide an optical scanning device, which provides a constant rim intensity of the radiation beam over the entrance pupil of the objective, when changing the vergence of the radiation beam between a collimator lens and an objective.

According to the invention, this object is achieved in that an optical component is provided by means of which the rim intensity of the radiation beam at the entrance pupil of the objective is substantially independent of the distance between the radiation source and the objective for constant marginal beam angle of said radiation beam at the entrance pupil of the objective.

An optical component is provided in the light path, which acts as a combined beam expander and a vergence switch. By means of this optical component it can be obtained to keep the rim intensity constant while using a beam with a variable vergence used for compensating spherical aberration in an optical scanning device, especially in a split optics configuration. When the distance between the collimator lens or the radiation source respectively and the objective is changed, the rim intensity of the radiation beam at the entrance pupil of the objective is substantially constant.

In a preferred embodiment of the optical scanning device according to the invention the optical component is provided as an electrowetting cell having two switchable meniscus interfaces.

The optical component is an electrowetting cell, which includes generally two fluids with in each case a certain volume in a fluid chamber. The fluids are in contact over an interface. Electrical energy or voltage respectively may be used directly to change the shape of this interface between the first and the second liquid. These fluids are substances that alter their shape in response to a force. Such fluids may be gases, liquids or mixtures of solids and liquids capable to flow.

In this embodiment of the invention the electrowetting cell includes two or three fluids in the fluid chamber so that the electrowetting cell contains two interfaces having the shape of a meniscus. Application of a voltage to two electrodes of the electrowetting cell causes a change in the curvature of the menisci of the electrowetting cell.

In a further embodiment of the optical scanning device according to the invention a radius $R_1$ of the first meniscus surface of the electrowetting cell substantially complies with $$R_1 = \frac{d_2 h_0 \left(1 - \frac{n_1}{n_2}\right)}{\left(h_0 - h_p + \alpha_3 \left(D + \frac{d_4}{n_4} + \frac{d_3}{n_3}\right)\right)}$$

wherein $d_2$, $d_3$, $d_4$ are thicknesses of media of the electrowetting cell; $n_1$, $n_2$, $n_3$, $n_4$ are refractive indices of media within the electrowetting cell; $h_p$ is the entrance pupil height of the objective to the optical axis; $h_0$ is the height of the incoming beam in front of the electrowetting cell to the optical axis; $\alpha_3$ is the entrance angle with the optical axis of the marginal ray at the entrance pupil of the objective; and D is the distance from an exit surface of the electrowetting cell to the objective.

By means of this equation it is possible to focus the beam very exactly at a certain position on the disc.

Furthermore, according to the invention, in order to have a certain angle at the entrance pupil between the radiation beam and the optical axis a radius $R_2$ of a second meniscus surface of the electrowetting cell must substantially complies with $$R_2 = \frac{n_3 - n_2}{\dfrac{1}{d_5 + \dfrac{d_4}{n_4} + \dfrac{d_3}{n_3}} - \dfrac{1}{\dfrac{R_1}{n_2 - n_1} - \dfrac{d_2}{n_2}}}$$

wherein $d_2$, $d_3$, $d_4$, $d_5$ are thicknesses of media of the electrowetting cell; $n_1$, $n_2$, $n_3$, $n_4$ are the refractive indices of media within the electrowetting cell; and $R_1$ is the radius of the first meniscus surface of the electrowetting cell.

The objects, advantages and features of the invention will be apparent from the following more particular description of preferred embodiments of the invention, as illustrated in the accompanying drawings, in which

FIG. 1 shows an optical scanning device including a slit-optical head scanning an optical record carrier 100. The scanning device comprises a radiation source 200 in the form of a semiconductor laser, which emits the radiation beam 30. The radiation beam is used for scanning an information layer 100 of the optical record carrier 100. The radiation beam emitted by the radiation source 200 enters a collimator lens 40. The collimator lens 40 converts the beam into a collimated beam 30', which goes through a polarizing beam splitter 50. The polarizing beam splitter 50 transmits the beam towards a galvano mirror 60, which rotates around the indicated axis. Then the collimated beam 30' goes through a quarter-wave plate 70, converting the beam into a circular polarized beam. The circular polarized beam is then reflected by a folding mirror 80. The beam is then focussed by means of an objective 90 onto the optical record carrier 100. The objective 90 may comprise one or more lenses and/or a grating. The converging beam passing through the objective 90 forms a spot on the information layer 101. Radiation reflected by the information layer 101 forms a diverging beam, transformed into a substantially collimated-beam by the objective 90 and is reflected by the folding mirror 80 again. The beam then passes through the quarter-wave plate 70 again. Since it is going the reverse direction, it will be polarized perpendicular to the original beam. This polarized beam impinges on the galvano mirror 60 and goes to the polarizing beam splitter 50. The beam splitter 50 separates the forward and reflected beams by reflecting at least part of the collimated beam towards a servo lens 110. Then the beam goes through a cylinder lens 120 towards a detection system 130. The detection system 130 captures the radiation and converts it into electrical output signals, which are processed by signal processing circuits, which are located in the scanning device separately from the optical head. A signal processor converts these output signals to various other signals.

Figure 1:
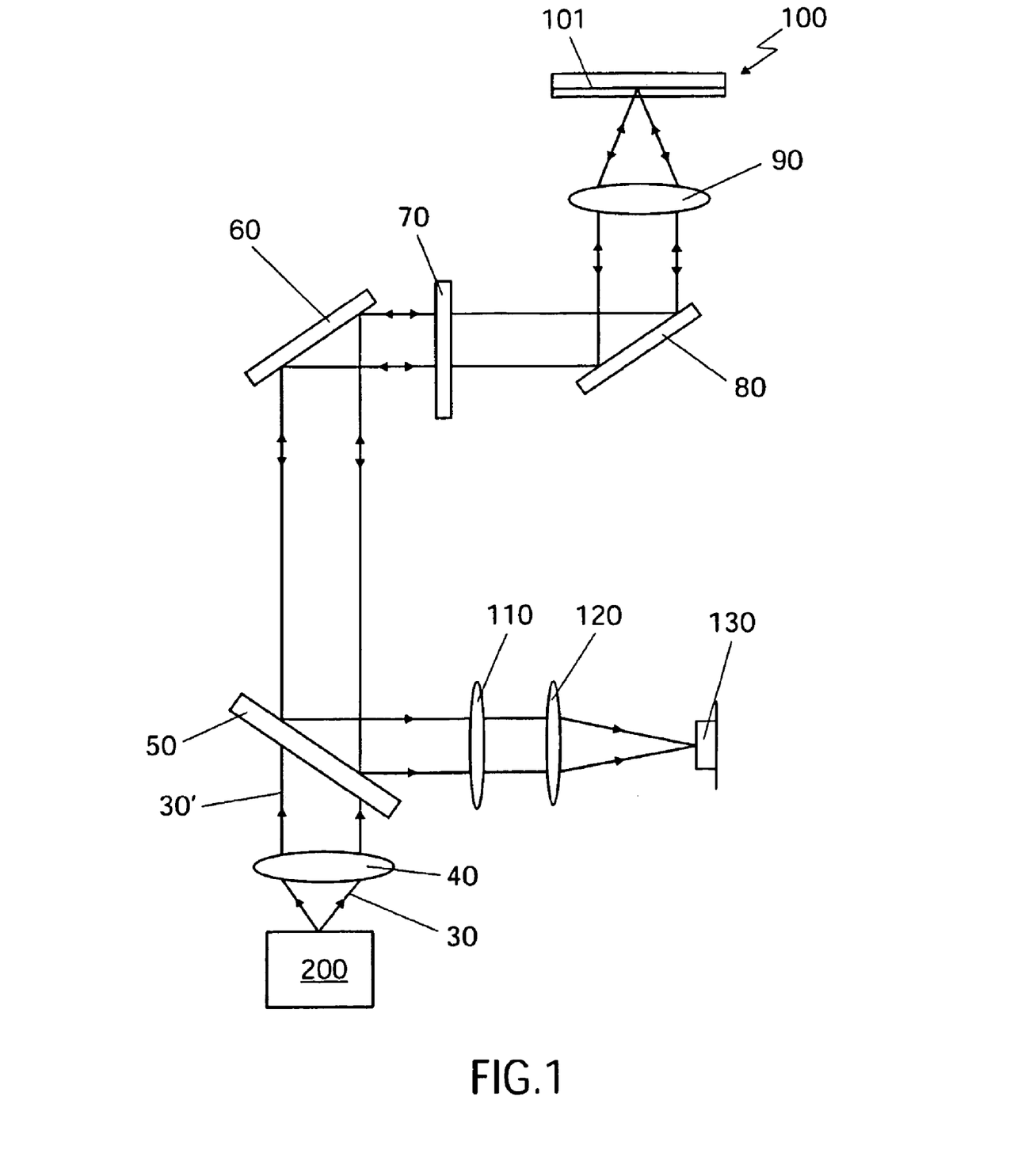
FIG. 1 shows an optical scanning device, incorporating a split optical head.

The optical scanning device according to FIG. 1 is a split optical head. Only the objective 90 and the folding mirror 80 move during access, whilst the remaining part of the optical pick-up unit is fixed. The fixed part includes the galvano mirror 60 to obtain accurate radial tracking. The rotational position of the galvano mirror 60 is measured with a split satellite detector accompanying the main high-frequency quadrant detector by monitoring the reflection from the uncoated quarter-wave plate. The galvano mirror 60 is designed such that its centre of gravity coincides with the axis of rotation. A linear motor and the galvano mirror 60 carry out the radial tracking, leaving only the axial tracking to the lens actuator. A 1-D focus actuator with leaf springs displaces the objective 90 axially with a sufficiently large stroke to sustain the focussing of both, CD and DVD discs. The actuator design is such that, even in the outermost position, the leaf springs remain sufficiently stiff to withstand the large radial accelerations.

Figure 2A:
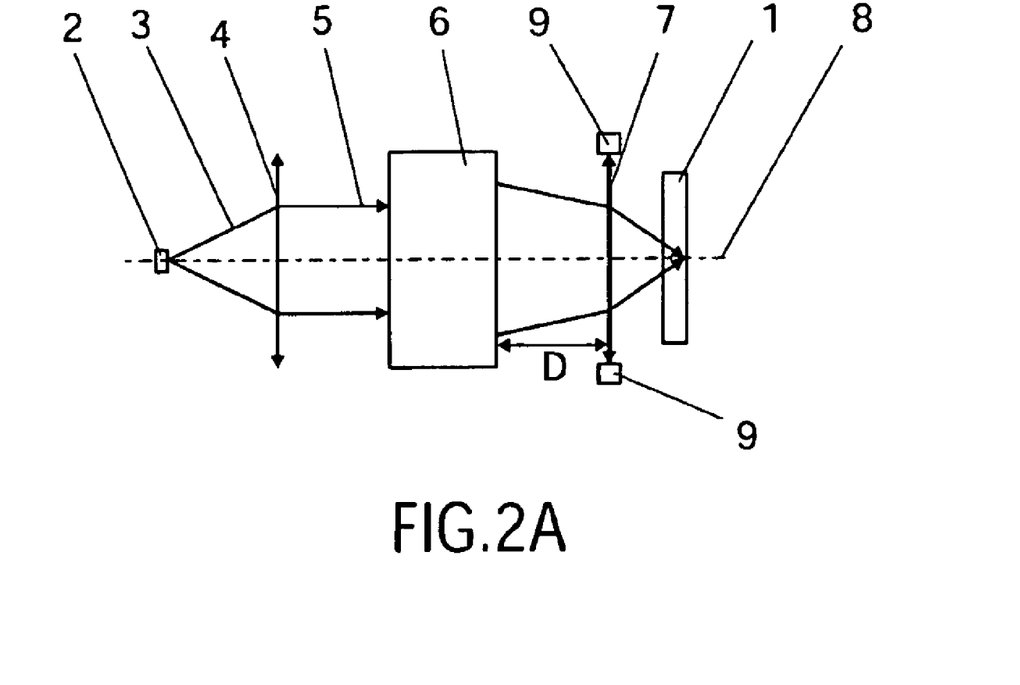
FIGS. 2A and 2B show a scanning device according to the invention.
Figure 2B:
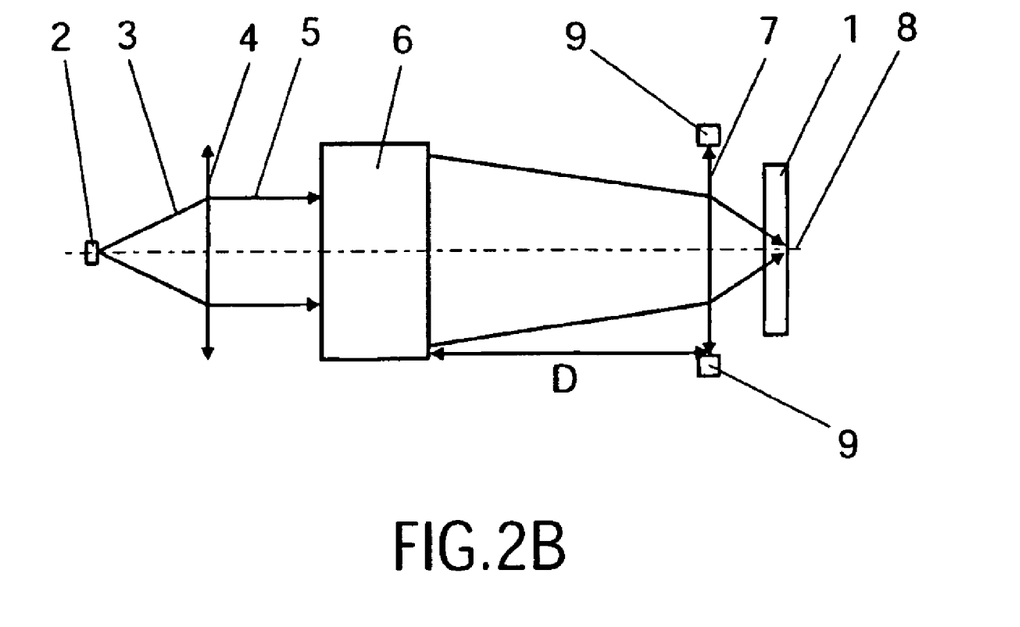

FIGS. 2A and 2B show a device for scanning an optical record carrier 1, as mentioned above, wherein only the most important components for the invention are shown and described. The record carrier 1 comprises a transparent layer, on one side of which an information layer is arranged. On the other side of the information layer a thin spacer layer is arranged. To the free side of the thin spacer layer another information layer is arranged. A protection layer is applied to protect the information layers from environmental influences. Thus, this record carrier 1 is a dual layer disc. The invention is not only related to a dual layer disc, but can also be a single layer disc.

The optical scanning device comprises a radiation source 2, for example a semiconductor laser, emitting a radiation beam 3. A beam splitter, not indicated in the Figure, for example a semitransparent plate or a prism cube beam splitter, transmits or reflects the radiation beam towards a collimator lens 4 where the diverging beam 3 is transformed into a parallel beam 5. After the beam 5 has passed the collimator lens 4 the beam impinges on an optical component 6. This optical component 6 is an electrowetting cell and acts as a combined beam expander and vergence switch. The electrowetting cell 6 additionally provided in the light path switches the vergence of the beam 5 at the entrance pupil of an objective 7 following the electrowetting cell 6 in ray direction such that the rim intensity of the beam at the entrance pupil of the objective 7 is substantially independent of the distance between the radiation source 2 and the objective 7. As previously mentioned, the objective 7 follows the electrowetting cell 6. The objective 7 converts the beam emerging the electrowetting cell 6 to form a scanning spot at the position of one information layer of the record carrier 1. The objective 7 is mounted in mounting means 9, for instance in an actuator, as described above, whereby the objective 7 may be moved to focus on an information layer. Due to this the scanning spot is kept in focus and on the track.

Figure 3A:
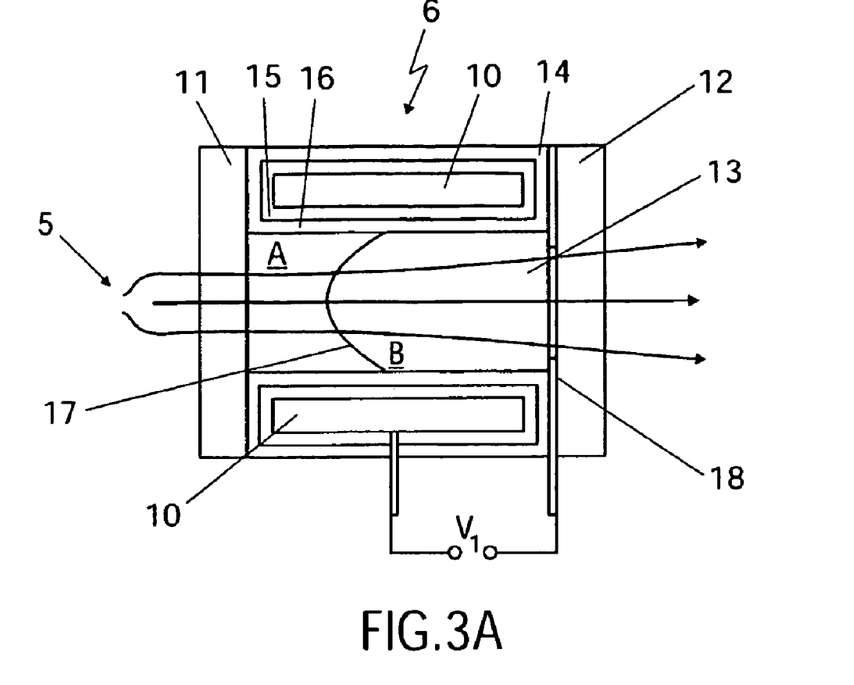
FIG. 3A shows in a side view an electrowetting cell having one meniscus.
Figure 3B:
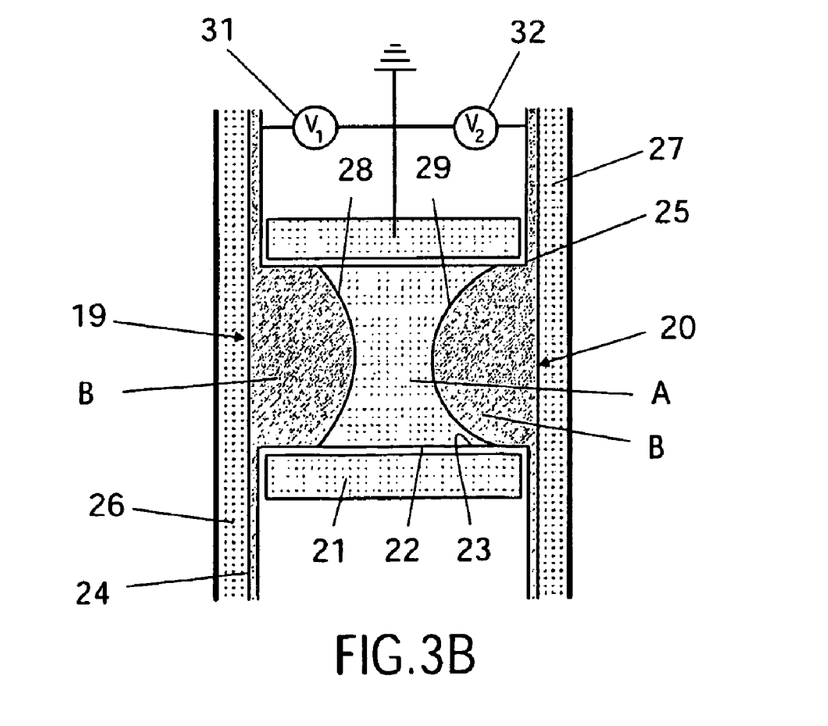
FIG. 3B shows in a side view an electrowetting cell having two independently controllable menisci.

The electrowetting cell 6 consists of two electrowetting cells as shown in FIG. 3A or one electrowetting cell as shown in FIG. 3B.

FIG. 3A shows a cross-section of a first sort of electrowetting cells. This electrowetting cell comprises a cylindrical first electrode 10 forming a capillary tube, sealed by means of a transparent front element 11 and a transparent back element 12 to form a fluid chamber 13. The fluid chamber 13 contains two fluids A and B. The electrode 10 may be a contacting coating arranged in the inner wall of a tube 14. The two fluids A and B consist of non-miscible liquids in the form of an electrical insulating first liquid A, such as silicon oil or an alkane and an electrical conducting second liquid B, such as an aqueous salt solution. Two liquids A and B are preferably arranged so as to have equal densities so that the electrowetting cell 6 functions independently of orientation, i.e. without dependence on gravitational effects between the two liquids A and B. This may be achieved by an appropriate choice of a first liquid constituent, e.g. alkanes or silicon oils may be modified by addition of molecular constituents to increase their density to match that of the salt solution.

Depending on the choice of the used oil, the refractive index of oil may vary between 1.25 and 1.6. Likewise, dependent on the amount of salt added, the salt solution may vary in refractive index between 1.33 and 1.48. The fluids in FIG. 3A are selected such that the first liquid A has a higher refractive index than the second liquid B.

The first electrode 10 is a cylinder with an inner radius typically between 1 mm and 20 mm. The electrode 10 is formed from a metallic material and is coated with an insulating layer 15. This insulating layer 15 may consist of parylene and has a thickness between 50 nm and 100 μm, with typical values lying between 1 μm and 10 μm. The insulating layer 15 is coated with a fluid conduct layer 16 reducing the hysteresis on the contact angle of a meniscus 17 with the cylindrical wall of the fluid chamber 13. The fluid contact layer 16 is preferably formed from an amorphous fluorocarbon such as Teflon AF 1600. The fluid contact layer 16 has a thickness between 5 nm and 15 μm. The Teflon AF 1600 coating may be produced by repeated dip coating of the electrode 10. A homogeneous layer of material of substantially uniform thickness is formed thereby since the cylindrical sides of the electrode 10 are substantially parallel to a second cylindrical electrode 10. Dip coating is performed by dipping the electrode whilst-moving the electrode into and out of the dipping solution along its axial direction. The parylene coating 15 may be applied by chemical vapor deposition. The wettability of the fluid contact layer 16 by this second fluid is substantially equal on both sides of the intersection of the meniscus 17 with the contact layer 16 when no voltage is applied between the first and second electrode 10.

A second annular electrode 18 is arranged at one end of the fluid chamber 13. At least one portion of the second electrode 18 is arranged in the fluid chamber 13 such that the electrode 18 acts on the second fluid B.

The two fluids A and B are non-miscible so that they tend to separate into two fluid bodies with the meniscus 17 in between. When no voltage is applied between the first and second electrode 10 and 18, the fluid contact layer 16 has a higher wettability with respect to the first fluid A than with respect to the second fluid B. Due to electrowetting the wettability of the second fluid B varies upon application of a voltage between the first electrode 10 and the second electrode 18, which tends to change the contact angle of the meniscus 17 at the three face line. The three-face line is the line of contact between the fluid contact layer 16 and the two liquids A and B. Thus, the shape of the meniscus 17 is variable in dependence on the applied voltage. The meniscus 17 between the first fluid A and the second fluid B is called concave, if the meniscus 17 is hollow as seen from the fluid having the higher refractive index.

Referring to FIG. 3A, when a low voltage V1, for instance between 0 V and 20 V, is applied between the electrodes 10 and 18, the meniscus 17 adopts a first concave meniscus shape. A collimated beam 5 passing through the electrowetting cell becomes strongly divergent. To reduce the concavity of the meniscus shape a higher voltage has to be applied between the first and second electrodes. When an intermediate voltage V2, for instance 20 V to 150 V depending on the thickness of the insulating layer 15 is applied between the electrodes, the meniscus 17 adopts a second concave meniscus shape having a radius of curvature increased in comparison with the meniscus 17 in FIG. 3A. Thus, the collimated beam 5 becomes weakly divergent. To generate a convex meniscus shape, a higher voltage has to be applied between the first and second electrodes. When a relative high voltage V3, for instance 150 V to 200 V, is applied between the electrodes, the meniscus 17 adopts a convex shape. Thus, the collimated beam 5 is converted into a convergent beam.

Although in the example of FIG. 3A the fluid A has a higher refractive index than the fluid B, the fluid A may also have a lower refractive index than fluid B.

FIG. 3B shows a cross-section of a further possible configuration of a electrowetting cell, which comprises two variable lens elements 19 and 20. This electrowetting cell comprises a cylinder 21 of conductive material. The cylinder 21 is coated with an insulating layer 22. A fluid contact layer 23 is arranged on the inner side of the cylinder 21. The conductive cylinder 21 forms a common first electrode for the lens elements 19 and 20. A second electrode of the first lens element 19 is constituted by an annular conductive layer 24 having a central transparent area for transmitting radiation. A conductive layer 25 at the right side of the figure forms the second electrode of the second lens element 20. Transparent layers 26 and 27 cover the conductive layers 24 and 25. The central portion of the cylinder 21 is filled with a first transparent and non-conductive liquid A. At each side of the liquid A a second transparent and conductive liquid B is provided. Liquid B has a lower refractive index than the first liquid A. The non-miscible liquids of fluids A and B at the left side are separated by a first meniscus 28. The fluids A and B at the right side are separated by a second meniscus 29.

The curvatures of the menisci 28 and 29 and thus the focal distances of the lens elements 19 and 20 can be changed independently from each other by means of controllable voltage sources 31 and 32.

Referring now to FIG. 2A showing the schematic drawing of the optical scanning device with the electrowetting cell 6 in the light path when the distance D between the objective 7 and the electrowetting cell 6 is small.

FIG. 2B shows the same as FIG. 2A, however, the distance D between the objective 7 and the electrowetting cell 6 is larger than the distance D in FIG. 2A. The electrowetting cell 6 not only changes the vergence of the incoming beam 5 but also the width of the beam 5 leaving this electrowetting cell 6 as a function of D in order to keep the beam rim intensity at the entrance pupil of the objective 7 constant.

Figure 4:
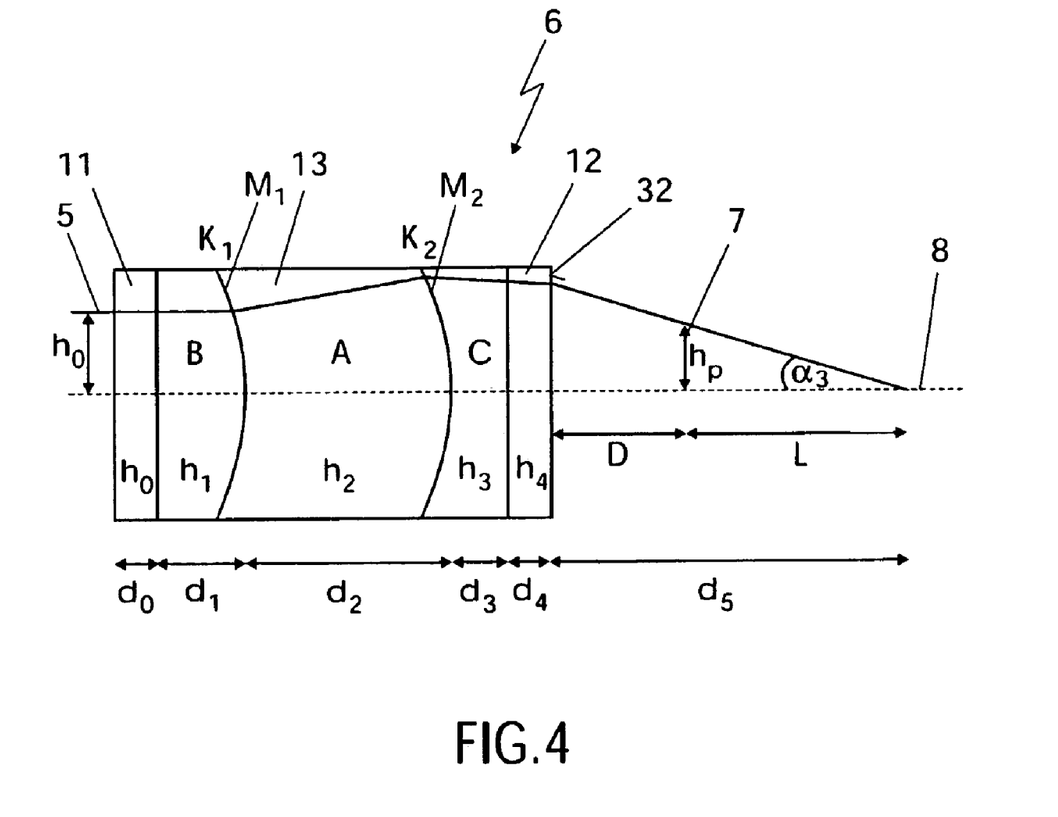
FIG. 4 shows in a side view an electrowetting cell according to the invention

Referring to FIG. 4 showing the electrowetting cell 6, which is sealed by means of the transparent front element 11 and the transparent back element 12 to form the fluid chamber 13. The fluid chamber 13 contains two different fluids in this embodiment of the invention. The fluid chamber 13 may also contain three different fluids. The fluids consist of non-miscible liquids in the form of an electrically insulating first liquid A that can be oil, an electrically conducting second liquid B that can be water and an electrically conducting third liquid C. The second liquid B and the third liquid C may be the same. The second liquid B and the third liquid C may also be water containing a salt solution. Each of the three liquids A, B and C has a certain volume and is arranged such that their densities are substantially equal. The fluids A, B and C have different refractive indices $n_1$, $n_2$ and $n_3$ and their interfaces $M_1$ and $M_2$ have a shape of a meniscus. In this embodiment the refractive index $n_1$ and $n_3$ are the same. The menisci $M_1$ and $M_2$ may have different refractive powers $K_1$ and $K_2$. The thicknesses of fluids A and B within the electrowetting cell 6 are shown by parameters $d_1$, $d_2$ and $d_3$. The thicknesses of the transparent elements 11 and 12 are shown by the parameters $d_0$ and $d_4$. The distance between an exit surface 32 of the electrowetting cell 6 and the objective 7 is shown by the parameter D. The parameter L is the object distance of the objective 7. Thus, the distance $d_5$ results from the parameters L and D.

If a voltage is applied between the liquid through electrodes (not shown) the shapes of the curvatures of the menisci $M_1$ and $M_2$ are changed.

In order to receive a constant rim intensity the incoming beam 5 at the height ho must enter the objective 7 at the outer radius of the entrance pupil of the objective 7 independent of the position of the objective 7 or independent of the distance between the radiation source 2 and the objective 7 respectively. Simultaneously, this incoming beam 5 must have a desired entrance angle $\alpha_3$ with the optical axis 8 at the entrance pupil of the objective 7. By switching the radii of the two menisci $M_1$ and $M_2$ of the electrowetting cell 6 it is possible to fulfil both requirements.

The two menisci $M_1$ and $M_2$ are independent. Therefore they result in two degrees of freedom. Due to the two degrees of freedom it is possible to switch the vergence of the beam 5 while keeping the rim intensity constant. In order to receive the constant rim intensity, the menisci $M_1$ and $M_2$ have to be defined in a way that both conditions or requirements are fulfilled. In the following it is described in which way these conditions may be fulfilled. In order to focus the beam 5 entering the electrowetting cell 6 at a height ho in a point of the distance $d_5$ further than the exit surface 13 of the electrowetting cell 6 it follows for the paraxial calculations that the thicknesses $d_1$, $d_2$, $d_3$ and $d_4$, the refractive indices $n_1$, $n_2$, $n_3$ and the refractive powers $K_1 = (n_2 - n_1)/R_1$ and $K_2 = (n_3 - n_2)/R_2$ must comply with $$K_2 = \frac{1}{d_5 + \frac{d_4}{n_4} + \frac{d_3}{n_3}} - \frac{n_2}{\frac{n_2}{K_1} - d_2} \tag{1}$$

$R_1$ and $R_2$ are the radii of the menisci $M_1$ and $M_2$. The sign convention is according to that described in "Aberrations of optical systems", by W. T. Welford (Adam Hilger, Bristol, ISBN 0-852740564-8). Furthermore, in order to have this beam make an angle $\alpha_3$ with the optical axis 8, it also follows from the paraxial calculations that $$K_1 = \frac{n_2}{d_2}\left(1 + \alpha_3 \frac{d_5 + \frac{d_4}{n_4} + \frac{d_3}{n_3}}{h_0}\right) \tag{2}$$

In this embodiment of the invention the angle $\alpha_3$ is negative for the situation in FIG. 4. If the angle $\alpha_3$ is negative, this means that the beam is convergent to a possible objective 7. However, it is also possible that the angle $\alpha_3$ is positive. In this case the beam is divergent.

Finally, it can be concluded from FIG. 4 in case the objective 7 having an entrance pupil height $h_p$ and is placed at a distance D from the exit surface 32 of the electrowetting cell 6, $d_5$ can be expressed as $$d_5 = D - \frac{h_p}{\alpha_3} \quad (3)$$

The minus sign in the equation (3) results from the negative angle $\alpha_3$ for the situation in FIG. 2.

It is now possible to describe the parameters $R_1$ and $R_2$. The values of the radii $R_1$ and $R_2$ can be described with the following equation, wherein the radii $R_1$ and $R_2$ must substantially comply with $$R_1 = \frac{d_2 h_0 \left(1 - \frac{n_1}{n_2}\right)}{\left(h_0 - h_p + \alpha_3 \left(D + \frac{d_4}{n_4} + \frac{d_3}{n_3}\right)\right)} \quad (4)$$

and $$R_2 = \frac{n_3 - n_2}{\frac{1}{d_5 + \frac{d_4}{n_4} + \frac{d_3}{n_3}} - \frac{1}{\frac{R_1}{n_2 - n_1} - \frac{d_2}{n_2}}} \quad (5)$$

The actual achieved values for $R_1$ and $R_2$ should preferably deviate less than 10% of the values of equations (4) and (5). When the distance D, namely the distance between the electrowetting cell 6 and the objective 7, changes, both radii $R_1$ and $R_2$ must be adjusted. Furthermore, the distances $d_1$, $d_2$ and $d_3$ change when the electrowetting cell 6 is switched.

Furthermore, by means of FIG. 4 an example for the invention is explained in greater detail. The electrowetting cell 6 is made of or includes three fluids A, B and C. As mentioned above the fluids B and C are the same. The fluids B and C are water with a refractive index of $n_1$=1.3494. As shown in FIG. 4, the fluid water exists two times. The other fluid A is oil with a refractive index of $n_2$=1.5499. The electrowetting cell 6 is sealed on both sides with the two transparent elements 11 and 12. The transparent elements 11 and 12 may be made of glass, for example BK7. By using of BK7 for the transparent elements 11 and 12 the refractive index of BK7 is shown by the parameters $n_0$ and $n_4$, wherein $n_0$=$n_4$=1.5302. The appropriate distances for $d_0$, $d_1$, $d_2$, $d_3$, $d_4$ are as follows: $d_0$=0.5 mm, $d_1$=0.8 mm, $d_2$=5.0 mm, $d_3$=0.8 mm and $d_4$=0.5 mm.

The dual layer disc 1 (not indicated in FIG. 4) has a first information layer at 0.1 mm and a second information layer at 0.09 mm. The position of the information layers of the dual layer disc 1 is measured from the side of reading out. The angle $\alpha_3$ corresponding to the information layer at 0.09 mm is −0.007781 radians.

In the following table 1 the radii $R_1$ and $R_2$ according to the equation (4) and (5) are tabulated for two values of D, while also the results according to ray-trace calculations are given.

TABLE 1

| | Ray trace | | Analytical | |
|---|---|---|---|---|
| D (mm) | $R_1$ (mm) | $R_2$ (mm) | $R_1$ (mm) | $R_2$ (mm) |
| 2 | −18.45 | −9.68 | −18.51 | −9.16 |
| 11 | −4.38 | −4.02 | −4.53 | −4.08 |

As can be seen from table 1, taking into account the paraxial approximation the results for $R_1$ and $R_2$ show a good correspondence. The small differences in finding an optimal value for $R_1$ and $R_2$ in combination with the objective 7 result in some spherical aberration introduced by the electrowetting cell 6. Although the spherical aberration is very small, there is a little change in values, which are optimal for the radii $R_1$ and $R_2$. The differences between the analytical and the ray trace nevertheless show a good correspondence.

The fulfillment of the both conditions according to the invention leads to a constant rim intensity independent of the distance between the radiation source and the objective. Although in the embodiments of the invention the electrowetting cell contains two menisci, it is not restricted to this case. It is also possible to provide two electrowetting cells each containing one meniscus. The invention can be used in optical recording systems, especially those using split optics.

It will be clear that any reference signs in the claims shall not be construed as limiting the scope.

The invention claimed is:

1. An optical scanning device for scanning an information layer (101) by means of a radiation beam (3,5,30,30'), the device comprising a radiation source (2,200) for emitting said radiation beam, an objective (7,90) for converting said radiation beam to a scanning spot at the position of said information layer, and mounting means (9) to adjust the distance between the radiation source and the objective, characterized in that an optical component (6) is provided by means of which the rim intensity of the radiation beam (5,30') at the entrance pupil of the objective (7,90) is substantially independent of the distance between the radiation source (2,200) and the objective for constant marginal beam angle of said radiation beam at the entrance pupil of the objective.

2. An optical scanning device as claimed in claim 1, characterized in that an incoming radiation beam (5,30') enters the objective (7,90) with a predetermined angle to the optical axis (8) and at a predetermined height of an outer radius of an entrance pupil of the objective independent of the distance between the objective and the radiation source (2,200).

3. An optical scanning device as claimed in claim 1, characterized in that the optical component (6) is provided as an electrowetting cell having two switchable meniscus interfaces ($M_1$, $M_2$).

4. An optical scanning device as claimed in claim 3, characterized in that the electrowetting cell (6) is arranged between a collimator lens (4,40) and the objective (7,90).

5. An optical scanning device as claimed in claim 3, characterized in that a radius $R_1$ of a first meniscus surface ($M_1$) of the electrowetting cell (6) substantially complies with $$R_1 = \frac{d_2 h_0 \left(1 - \frac{n_1}{n_2}\right)}{\left(h_0 - h_p + \alpha_3 \left(D + \frac{d_4}{n_4} + \frac{d_3}{n_3}\right)\right)}$$

wherein $d_2$, $d_3$, $d_4$ are thicknesses of media of the electrowetting cell, $n_1$, $n_2$, $n_3$, $n_4$ are the refractive indices of media within the electrowetting cell, $h_p$ is the entrance pupil height of the objective to the optical axis, $h_0$ is the height of the incoming beam in front of the electrowetting cell to the optical axis, $\alpha_3$ is the entrance angle with the optical axis of the marginal ray at the entrance pupil of the objective and D is the distance from an exit surface of the electrowetting cell to the objective.

6. An optical scanning device as claimed in claim 3, characterized in that a radius $R_2$ of a second meniscus surface ($M_2$) of the electrowetting cell (6) substantially complies with $$R_2 = \frac{n_3 - n_2}{\dfrac{1}{d_5 + \dfrac{d_4}{n_4} + \dfrac{d_3}{n_3}} - \dfrac{1}{\dfrac{R_1}{n_2 - n_1} - \dfrac{d_2}{n_2}}}$$

wherein $d_2$, $d_3$, $d_4$, $d_5$ are thicknesses of media of the electrowetting cell, $n_1$, $n_2$, $n_3$, $n_4$ are the refractive indices of media within the electrowetting cell and $R_1$ is the radius of the first meniscus surface of the electrowetting cell.

7. An optical scanning device as claimed in claim 1, characterized in that at least one information layer (101) is provided in an optical record carrier (1,100).

8. An optical recording system comprising an optical scanning device as claimed in claim 1.

* * * * *